Jan. 2, 1962   E. L. WARRICK   3,015,331
BLOOD OXYGENATOR
Filed Oct. 17, 1957
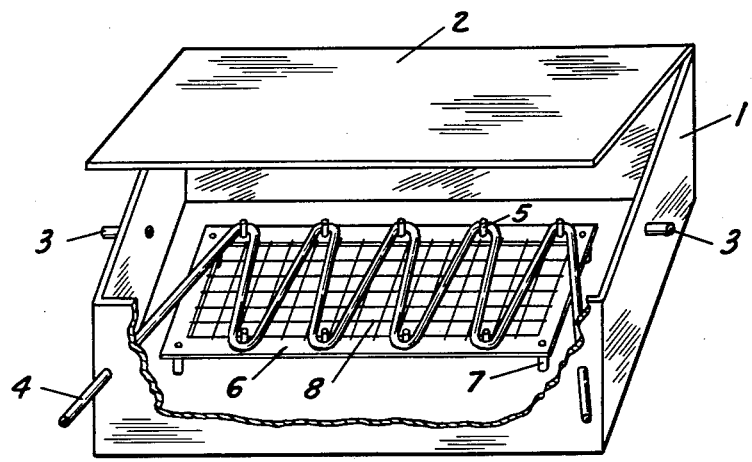
INVENTOR
*EARL L. WARRICK*
BY
*Robert F. Fleming Jr.*
ATTORNEY

United States Patent Office 3,015,331
Patented Jan. 2, 1962

3,015,331
BLOOD OXYGENATOR
Earl L. Warrick, Midland, Mich., assignor to Dow Corning Corporation, Midland, Mich., a corporation of Michigan
Filed Oct. 17, 1957, Ser. No. 690,762
2 Claims. (Cl. 128—214)

This invention relates to a method of oxygenating blood during surgical operations.

In recent years great advances have been made in heart surgery and these advances have in part been due to the use of heart-lung machines which allow the patient's heart to be emptied of blood and to be at rest during the operation.

At the present time, the artificial lung consists essentially of a tube through which the blood is passed as oxygen is bubbled through the blood. The excess gas is then removed from the tube and the blood passes into a reservoir which serves the purpose of removing any bubbles which may be in the blood. From thence the blood passes through a filter and then back into the patient. Whereas these lung machines are operative they suffer from several disadvantages. One is the relatively large capacity required to efficiently carry out the oxygenation process. Because of this large capacity difficulty is experienced in operating on infants because the amount of blood which is required to be outside the body is greater than the infant can tolerate. Another disadvantage is that in spite of settling reservoirs and the use of silicone antifoam agents there is still danger of air embolism being formed, and third, due to the great mechanical agitation to which the blood is subjected by the bubbling process there is always a certain amount of injury to blood cells. Furthermore, the mechanical agitation increases the danger of clot formation, and the use of antifoam agent introduces an extraneous material in the blood. Because of the danger of clots and the presence of this extraneous material, it is necessary to filter the blood before it is returned to the body. This adds to the volume of the machine.

It is the object of this invention to provide an artificial lung which avoids agitation of the blood, the use of antifoam agents, the danger of air embolism and which causes little or no injury to the blood.

In accordance with this invention the blood is passed through a tube of silicone rubber while the tube is immersed in an atmosphere of oxygen. During this process the oxygen diffuses through the silicone rubber into the blood and carbon dioxide diffuses out into the atmosphere. The blood is maintained in contact with the oxygen for sufficient time to properly oxygenate it. After passing through the tube the blood is returned to the patient.

The method of this invention can be carried out using any suitable apparatus. One such apparatus is shown in the drawing. The drawing is a view of a container 1 which is provdeid with a lid 2 and gas inlet and outlet tubes 3. The lid of the container is shown in a raised position and the front section shown cut away in order to expose a suitable arrangement of the silicone rubber tube 4. The tube is wound around pegs 5 which are attached to frame 6. The frame rests on legs 7 and is provided with a wire mesh 8. A mesh is employed as a support for the tube to insure that a maximum surface area of the tube is exposed to oxygen.

In the operation of this apparatus blood is pumped by means of a suitable artificial pump such as a Sigmamotor or De Bakey pump from the patient through the rubber tube 4 while oxygen is passed through the container by means of inlet and outlet tube 3. As the blood passes along the sinuous tube oxygen diffuses through the silicone rubber walls into the blood and carbon dioxide diffuses from the blood through the silicone rubber wall into the container from which it is swept out through outlet tube 3.

For the purpose of this invention any silicone rubber which is free of toxic materials can be employed. The preferred silicone rubbers are those which are vulcanized with peroxide and which contain an inorganic filler, preferably silica. It is desirable, but not essential, that the silicone rubber be sufficiently clear to allow the observation of the color changes in the blood. It is desirable, of course, that the walls of the silicone rubber tube be as thin as practicable since the thinner the tube wall the more rapidly will the oxygenation of the blood take place. At the present time, silicone rubber tubes can be satisfactorily made which have wall thicknesses of $\frac{1}{64}$ to $\frac{1}{8}$ inch. However, these thicknesses are not critical and thinner and thicker tubes can be employed. The thicker the tube wall the longer it will be necessary to have the blood remain in contact with the oxygen in order to accomplish the desired result.

Many variations can be made in the apparatus shown in the drawing without departing from the scope of this invention. For example, more than one sinuous coil of tubing can be employed. This could be done by any suitable means, for example, by stacking trays 6 on top of each other and running the rubber tubing from one tray to another thereby increasing the length of tubing in contact with the oxygen. If desired, the openings through which the tube passes can be in the form of slots or adjustable openings so that the inlet and outlet tube for the blood can be adjusted to any desired height.

If desired, the container 1 can be provided with pressure valves so that the oxygen in contact with the tube can be held at a superatmospheric pressure. The container and trays can be of any suitable material. Preferably the container should be made of a transparent material or at least provided with a window so that the color changes in the blood can be observed.

In the functioning of the apparatus shown in this invention the effective contact time between the oxygen and the blood can be varied by increasing the oxygen pressure in the atmosphere surrounding tube 4, increasing the length of the tube within the container, and by adjusting the rate of flow of blood through the tube.

The primary advantage of the method of this invention is that the blood never comes in contact with any material which causes injury thereto. It is highly desirable that the silicone rubber tubing be extruded over a smooth mandrel in order that the interior surface shall be free of any imperfections. The smoother the inside of the tube the more desirable it is for this operation.

That which is claimed is:

1. An apparatus for oxygenating blood which comprises a container provided with an inlet and outlet for oxygen and within said container silicone rubber tubing in sinuous configuration, having blood inlet means, said tubing being of sufficient length and wall thickness to allow the oxygen to diffuse therethrough into blood passing through said tubing and to allow carbon dioxide to diffuse from the blood through said tube wall into the container said silicone rubber tube being composed of peroxide vulcanized rubber having a high diffusion rate for oxygen and carbon dioxide, support means for said tube and outlet means for passing blood out through said tube.

2. An apparatus for oxygenating blood which comprises a container provided with an inlet and outlet for oxygen and within said container silica filled silicone rubber tubing in sinuous configuration, having blood inlet means, said tubing being of sufficient length and wall thickness to allow oxygen to diffuse therethrough into blood passing through said tubing and to allow carbon dioxide to diffuse from the blood through said tube wall into the container, said silicone rubber tube being composed of peroxide vulcanized rubber having a high diffusion rate for oxygen and carbon dioxide, support means for said tube and outlet means for passing blood out through said tube.

References Cited in the file of this patent

FOREIGN PATENTS

| | | |
|---|---|---|
| 694,918 | Great Britain | July 29, 1953 |
| 972,808 | France | Sept. 6, 1950 |

OTHER REFERENCES

Kolff et al.: Cleveland Clinic Quarterly, vol. 23, No. 2, April 1956, pages 69–97 (pages 69–78 relied on) (available at National Library of Medicine, Washington, D.C.)

"Nomenclature of Silicon Compounds," Chemical and Engineering News, vol. 24, pages 1233–1236 (page 1234 relied on), May 10, 1946.

"Silicone Rubber," Rubber Age, vol. 56, No. 2, pages 173–175, November 1944 (available in Science Library), 260–46.5G.

Hackh's Chemical Dictionary (American and British Usage), 3rd edition, The Blakiston Company, Philadelphia, page 772 (copy in Division 50).